United States Patent
Jeyapaul et al.

(10) Patent No.: US 12,189,454 B2
(45) Date of Patent: Jan. 7, 2025

(54) DEPLOYMENT AND MANAGEMENT OF ENERGY EFFICIENT DEEP NEURAL NETWORK MODELS ON EDGE INFERENCE COMPUTING DEVICES

(71) Applicant: International Business Machines Corporation, Armonk, NY (US)

(72) Inventors: Rajesh Kumar Jeyapaul, Bengaluru (IN); Sivapatham Muthaiah, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 17/449,871

(22) Filed: Oct. 4, 2021

(65) Prior Publication Data

US 2023/0104246 A1   Apr. 6, 2023

(51) Int. Cl.
*G06F 1/3234* (2019.01)
*G06F 11/30* (2006.01)
(Continued)

(52) U.S. Cl.
CPC ........ *G06F 1/3234* (2013.01); *G06F 11/3062* (2013.01); *G06N 3/082* (2013.01); *G06N 3/10* (2013.01)

(58) Field of Classification Search
CPC ... G06F 1/3234; G06F 11/3062; G06N 3/082; G06N 3/10
See application file for complete search history.

(56) References Cited

U.S. PATENT DOCUMENTS

| | | |
|---|---|---|
| 8,190,939 B2 | 5/2012 | Fields, Jr. et al. |
| 8,643,656 B2 | 2/2014 | Li et al. |

(Continued)

FOREIGN PATENT DOCUMENTS

| | | |
|---|---|---|
| EP | 2399183 B1 | 9/2016 |
| WO | 2017214728 A1 | 12/2017 |

(Continued)

OTHER PUBLICATIONS

Galanis, Ioannis, et al. "Inference and energy efficient design of deep neural networks for embedded devices." 2020 IEEE Computer Society Annual Symposium on VLSI (ISVLSI). IEEE, 2020. (Year: 2020).*

(Continued)

*Primary Examiner* — Eric Nilsson
(74) *Attorney, Agent, or Firm* — Yee & Associates, P.C.

(57) ABSTRACT

Deploying energy-rated deep neural network models on energy-scored edge devices is provided. An overall energy efficiency rating is assigned to a deep neural network model based on utilizing software optimization and hardware accelerators during training of the deep neural network model. Energy scores are assigned to respective edge devices in an edge inference computing environment based on properties of each respective edge device. Particular edge devices are selected that have a corresponding energy score within a defined edge device energy score range for the overall energy efficiency rating that corresponds to the deep neural network model. The deep neural network model is deployed to the particular edge devices that have a corresponding energy score within the defined edge device energy score range for the overall energy efficiency rating that corresponds to the deep neural network model.

20 Claims, 13 Drawing Sheets

(51) Int. Cl.
    *G06N 3/082*     (2023.01)
    *G06N 3/10*     (2006.01)

(56) References Cited

U.S. PATENT DOCUMENTS

| | | |
|---|---|---|
| 9,342,376 B2 * | 5/2016 | Jain ........................ H04L 41/12 |
| 9,904,874 B2 | 2/2018 | Shoaib et al. |
| 2017/0286830 A1 | 10/2017 | El-Yaniv et al. |
| 2018/0189641 A1 | 7/2018 | Boesch et al. |
| 2021/0158145 A1 | 5/2021 | Lin et al. |

FOREIGN PATENT DOCUMENTS

| | | |
|---|---|---|
| WO | 2020102887 A1 | 5/2020 |
| WO | 2020260656 A1 | 12/2020 |

OTHER PUBLICATIONS

"Preparing a Model for Quantization," Intel Corporation, GitHub, Inc., copyright 2021, accessed Oct. 5, 2021, 3 pages. https://intellabs.github.io/distiller/prepare_model_quant.html.

Stanisic et al., "Performance Analysis of HPC Applications on Low-Power Embedded Platforms," Design, Automation & Test in Europe, Mar. 2013, Grenoble, France, 7 pages. https://hal.inria.fr/hal-00872482/document.

Rajovic et al., "The Low-power Architecture Approach Towards Exascale Computing," ScalA'11, Nov. 14, 2011, Seattle, Washington, 2 pages. ACM 978-1-4503-1180-9/11/11. https://www.doc.ic.ac.uk/~lvilanov/publications/files/scala11_low_power.pdf.

Suryavansh, "How to make your own deep learning accelerator chip!," Sep. 18, 2019, accessed Oct. 1, 2021, 16 pages. https://towardsdatascience.com/how-to-make-your-own-deep-learning-accelerator-chip-1ff69b78ece4.

* cited by examiner

ENERGY RATING AND OVERALL ENERGY EFFICIENCY
RATING FOR FLOPS/WATT BENCHMARKING TABLE
400

| FLOPS / WATT | ENERGY RATING | OVERALL ENERGY EFFICIENCY RATING |
|---|---|---|
| 1G | 4 | 4+ OR 4++ |
| 500M | 3 | 3+ OR 3++ |
| 10M | 2 | 2+ OR 2++ |
| 100K | 1 | 1+ OR 1++ |

ENERGY-RATED DNN
MODEL PROFILE
500

| DNN MODEL ARCHITECTURE – MOBILENET QUANTIZATION – YES HW ACCELERATORS – YES FLOPS – 9499 WATTS – 4.7 | ENERGY RATING (ER) HW - 4 SW - 5 FINAL RATING - 4.5 | POST MODEL TRAINING QUANTIZATION YES PRECISION - INT8 | OVERALL ENERGY EFFICIENCY RATING ER++ FINAL RATING - 4.5++ |
|---|---|---|---|

ENERGY WEIGHT ALLOCATION TO
ENERGY CONSUMING
COMPONENTS OF EDGE DEVICES TABLE
700

EDGE DEVICE - A (702)

| TOP ENERGY CONSUMING COMPONENTS | COMPONENT SPECS AS PER OEM | ENERGY WEIGHT (W) ALLOCATED |
|---|---|---|
| CPU | 1 CPU 1GHz | 0.3 |
| GPU | 1 GPU 1GB | 0.5 |
| MEMORY (RAM) | 2GB | 0.1 |
| DISK | 8GB FLASH | 0.1 |
|  |  | 1 |

EDGE DEVICE - B (704)

| TOP ENERGY CONSUMING COMPONENTS | COMPONENT SPECS AS PER OEM | ENERGY WEIGHT (W) ALLOCATED |
|---|---|---|
| CPU | 2 CPU 1GHz | 0.1 |
| GPU | 4 GPU 4GB | 0.6 |
| MEMORY (RAM) | 4GB | 0.1 |
| DISK | 32GB SDD | 0.2 |
|  |  | 1 |

FIG. 7

EDGE DEVICE ENERGY SCORE CALCULATION TABLE
800

EDGE DEVICE - A

| TOP ENERGY CONSUMING COMPONENTS | ENERGY WEIGHT (W) ALLOCATED | FREE %(F) CALCULATED | ENERGY SCORE CALCULATED W x F |
|---|---|---|---|
| CPU | 0.3 | 80 | 24 |
| GPU | 0.5 | 90 | 45 |
| MEMORY (RAM) | 0.1 | 60 | 6 |
| DISK | 0.1 | 70 | 7 |
|  |  |  | 82 |

EDGE DEVICE - B

| TOP ENERGY CONSUMING COMPONENTS | ENERGY WEIGHT (W) ALLOCATED | FREE %(F) CALCULATED | ENERGY SCORE CALCULATED W x F |
|---|---|---|---|
| CPU | 0.1 | 5 | 0.5 |
| GPU | 0.6 | 5 | 3 |
| MEMORY (RAM) | 0.1 | 50 | 5 |
| DISK | 0.2 | 50 | 10 |
|  |  |  | 18.5 |

FIG. 8

DNN MODEL TO EDGE DEVICE DEPLOYMENT POLICY
900

| DNN MODEL'S OEER | RANGE OF DEVICE ENERGY SCORES |
|---|---|
| 5 OR 5+ OR 5++ OR 4++ | SCORE ≤ 30 |
| 4++ OR 4+ OR 3++ | SCORE ≤ 50 AND SCORE > 30 |
| 3 OR 3+ OR 2++ OR 2+ | SCORE ≤ 70 AND SCORE > 50 |
| 2 OR 1 OR 1+ OR 1++ | SCORE ≤ 90 AND SCORE > 70 |

FIG. 9

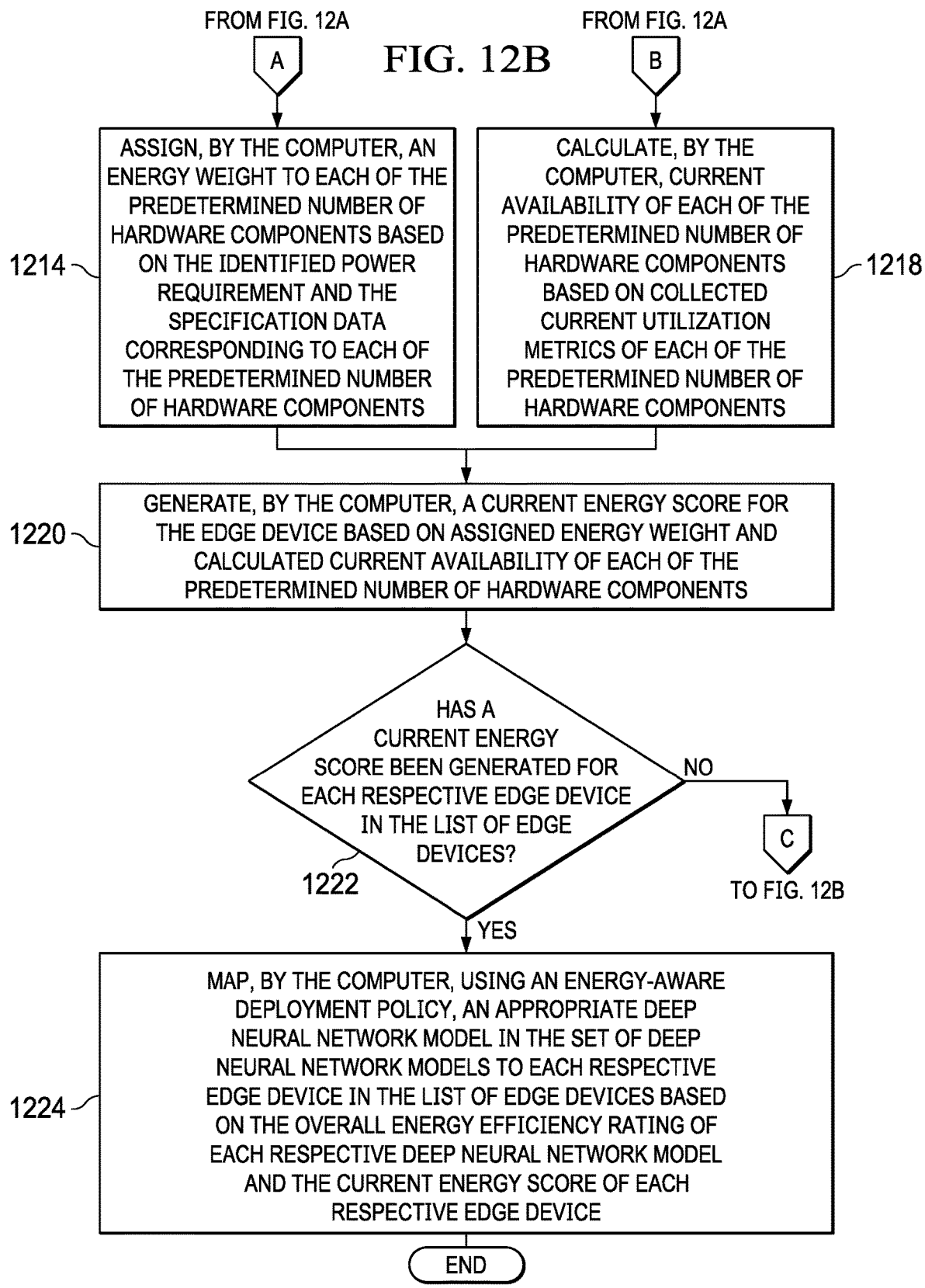

DEPLOYMENT AND MANAGEMENT OF ENERGY EFFICIENT DEEP NEURAL NETWORK MODELS ON EDGE INFERENCE COMPUTING DEVICES

BACKGROUND

1. Field

The disclosure relates generally to deep neural networks and more specifically to deployment and management of energy efficient deep neural network models on edge inference computing devices.

2. Description of the Related Art

Deep learning is part of a broader family of machine learning methods based on artificial neural networks with representation learning. Learning can be supervised, semi-supervised, or unsupervised. Deep learning architectures, such as deep neural networks, have been applied to fields including computer vision, speech recognition, natural language processing, machine translation, bioinformatics, medical image analysis, material inspection, and board game programs, where these deep learning architectures have produced results comparable to human expert performance. A deep neural network is an artificial neural network with multiple hidden layers comprised of neurons between the input and output layers. Deep neural networks receive a set of inputs, perform progressively complex calculations on the set of inputs, and provide an output to solve real world problems, such as, for example, classification. The number of hidden layers in a deep neural network can be large (e.g., 1000 hidden layers).

SUMMARY

According to one illustrative embodiment, a computer-implemented method for deploying energy-rated deep neural network models on energy-scored edge devices is provided. A computer assigns an overall energy efficiency rating to a deep neural network model based on utilizing software optimization and hardware accelerators during training of the deep neural network model. The computer assigns energy scores to respective edge devices in an edge inference computing environment based on properties of each respective edge device. The computer selects particular edge devices that have a corresponding energy score within a defined edge device energy score range for the overall energy efficiency rating that corresponds to the deep neural network model. The computer deploys the deep neural network model to the particular edge devices that have a corresponding energy score within the defined edge device energy score range for the overall energy efficiency rating that corresponds to the deep neural network model. According to other illustrative embodiments, a computer system and computer program product for deploying energy-rated deep neural network models on energy-scored edge devices are provided.

BRIEF DESCRIPTION OF THE DRAWINGS

FIG. 4 is a diagram illustrating an example of an energy rating and overall energy efficiency rating for FLOPS/Watt benchmarking table in accordance with an illustrative embodiment;

FIG. 5 is a diagram illustrating an example of an energy-rated deep neural network model profile in accordance with an illustrative embodiment;

FIG. 7 is a diagram illustrating an example of an energy weight allocation to energy consuming components of edge devices table in accordance with an illustrative embodiment;

FIG. 8 is a diagram illustrating an example of an edge device energy score calculation table in accordance with an illustrative embodiment;

FIG. 9 is a diagram illustrating an example of a deep neural network model to edge device deployment policy in accordance with an illustrative embodiment;

FIGS. 12A-12B are a flowchart illustrating a process for energy scoring edge devices in accordance with an illustrative embodiment;

DETAILED DESCRIPTION

Figure 1:
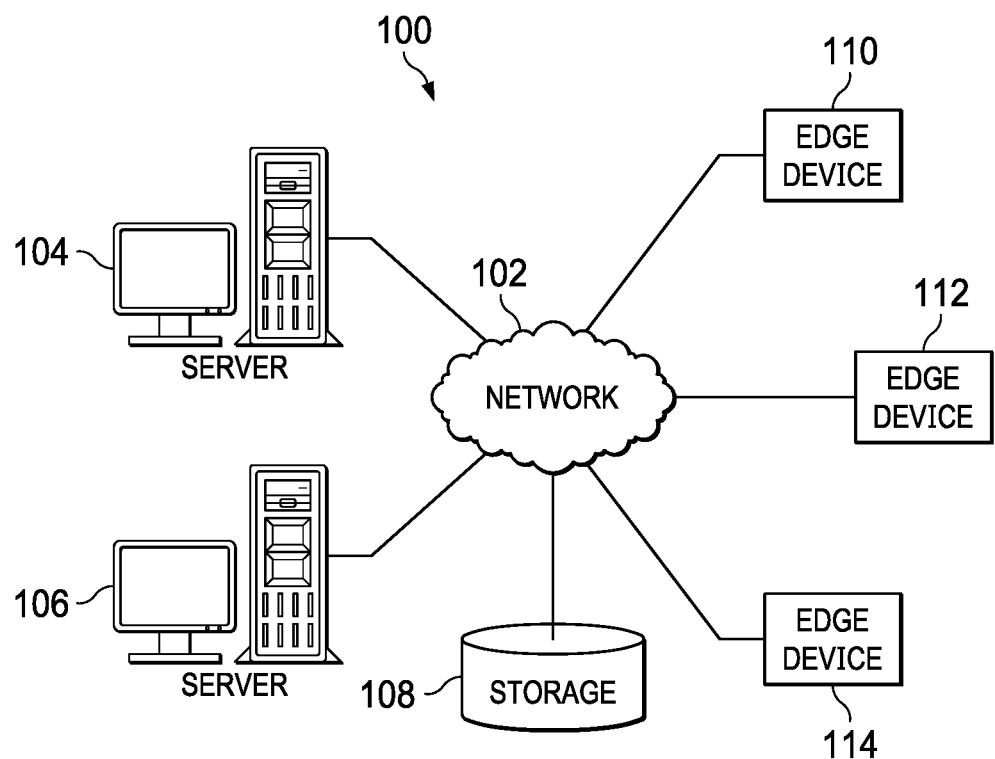
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
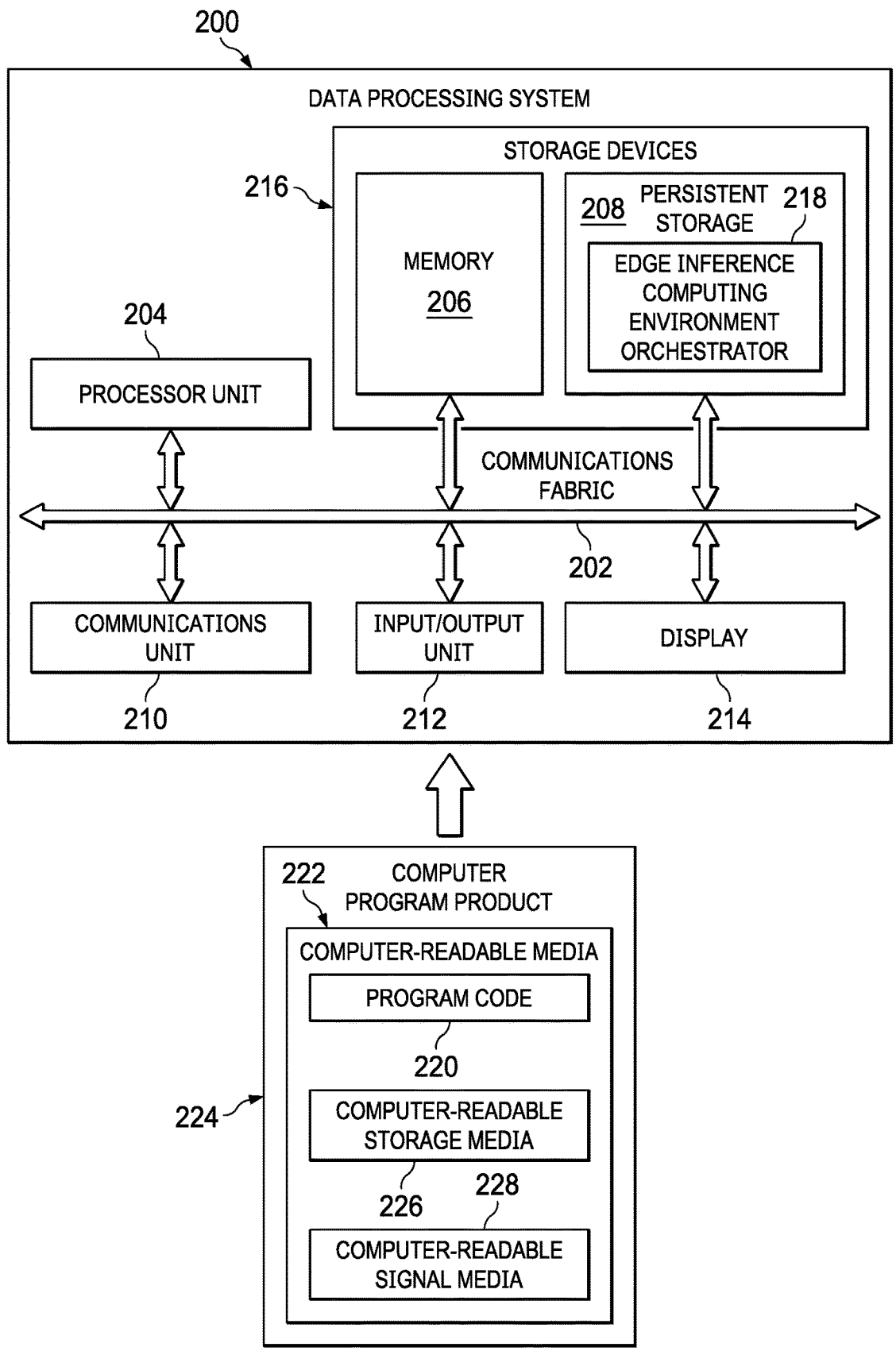
FIG. 2 is a diagram of a data processing system in which illustrative embodiments may be implemented.
Figure 3:
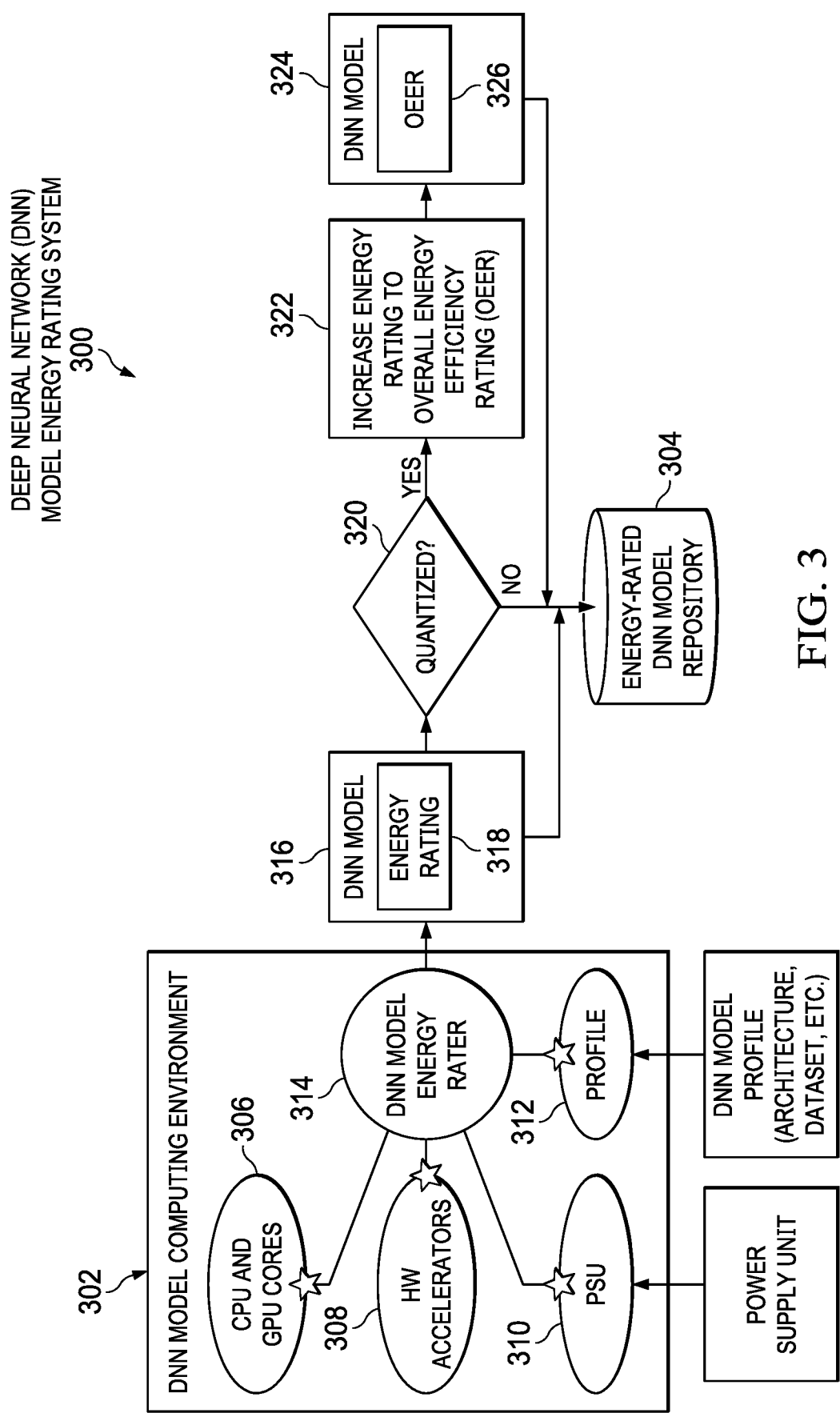
FIG. 3 is a diagram illustrating an example of a deep neural network model energy rating system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. In this example, network data processing system 100 represents an edge inference computing environment comprising a plurality of heterogeneous edge devices that performs inference computing using deep neural network models.

Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 provide orchestration services for deploying and managing energy-rated deep neural network models on energy-scored edge devices. Server 104 and server 106 deploy an appropriate energy-rated deep neural network model on a set of energy-scored edge devices using an energy-aware deployment policy that matches an energy rating of a respective deep neural network to a range of energy scores for edge devices. As a result, server 104 and server 106 are capable of deploying the correct deep neural network model on a particular edge device of the edge inference computing environment based on the total current energy score of that particular edge device being within the range of edge device energy scores corresponding to the energy rating of that particular deep neural network model as defined by the energy-aware deployment policy.

Edge device 110, edge device 112, and edge device 114 also connect to network 102. Edge devices 110, 112, and 114 are clients of server 104 and server 106. In this example, edge devices 110, 112, and 114 are shown as desktop or personal computers with wire communication links to network 102. However, it should be noted that edge devices 110, 112, and 114 are examples only and may represent other types of data processing systems, such as, for example, network computers, laptop computers, handheld computers, smart phones, smart watches, smart glasses, smart vehicles, smart televisions, smart appliances, virtual reality devices, gaming devices, and the like, with wire or wireless communication links to network 102. Edge devices 110, 112, and 114 are edge inference computing devices that provide inference or prediction computing for users of the edge inference computing environment.

Storage 108 is a network storage device capable of storing any type of data in a structured format or an unstructured format. In addition, storage 108 may represent a plurality of network storage devices. Further, storage 108 may store identifiers and network addresses for a plurality of servers, identifiers and network addresses for a plurality of edge devices along with their corresponding specifications and energy scores, a plurality of deep neural network models along with their corresponding profiles and energy ratings, a set of energy-aware deployment policies, and the like. Furthermore, storage 108 may store other types of data, such as authentication or credential data that may include usernames, passwords, and the like associated with system administrators and users, for example.

In addition, it should be noted that network data processing system 100 may include any number of additional servers, edge devices, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to edge device 110 over network 102 for use on edge device 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the deep neural network model deployment processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores edge inference computing environment orchestrator 218. However, it should be noted that even though edge inference computing environment orchestrator 218 is illustrated as residing in persistent storage 208, in an alternative illustrative embodiment, edge inference computing environment orchestrator 218 may be a separate component of data processing system 200. For example, edge inference computing environment orchestrator 218 may be a hardware component coupled to communication fabric 202 or a combination of hardware and software components. In another alternative illustrative embodiment, a first set of components of edge inference computing environment orchestrator 218 may be located in data processing system 200 and a second set of components of edge inference computing environment orchestrator 218 may be located in a second data processing system, such as, for example, server 106 in FIG. 1.

Edge inference computing environment orchestrator 218 controls the process of deploying an appropriate deep neural network model on a particular edge device, which is one of a plurality of edge devices comprising an edge inference computing environment, having a current energy score that matches an energy rating of the deep neural network model according to an energy-aware deployment policy. As a result, data processing system 200 operates as a special purpose computer system in which edge inference computing environment orchestrator 218 in data processing system 200 enables the correct deployment of deep neural network models on edge devices for increased energy efficiency and edge inference computing performance. In particular, edge inference computing environment orchestrator 218 transforms data processing system 200 into a special purpose computer system as compared to currently available general computer systems that do not have edge inference computing environment orchestrator 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Illustrative embodiments utilize energy efficient deep neural network models on edge devices for effective inference computing in an energy-aware edge inference computing environment. Illustrative embodiments utilize energy-rated deep neural network models, energy-scored edge inference computing devices, and an energy-aware deployment policy for effective monitoring and management of the energy-aware edge inference computing environment.

One issue with current solutions is that no visibility exists for energy saving capabilities of deep neural network models. For example, computing cores, such as, for example, graphics processing units, have exhibited greater performance and energy efficiency using hardware accelerators for high-throughput, high-latency applications, such as, for example, simulations involving partial differential equations, convolutions used in image processing, deep neural network model training and inference, and the like. Although graphics processing unit-accelerated systems are being adopted by deep learning training applications, power consumption remains an issue during inference. As a result, to further increase energy saving options, deep neural network model training can apply network pruning and quantization to increase energy saving options. Combining both hardware accelerators and software optimization techniques, deep neural network models can become more energy efficient.

Hardware acceleration describes the process of tasks being offloaded to a hardware component or device that specializes in a particular task. For example, a hardware component that is responsible for handling almost any task performed on a computer is the central processing unit. Usually, the central processing unit does a great job performing different tasks. However, there are times when the central processing unit is overworked and struggles to deliver. That is when hardware acceleration comes into play. For example, using a software program for video rendering may cause the central processing unit to struggle to keep up with the demand, causing the whole process to take more time to complete. By enabling hardware acceleration, a graphics processing unit will take over part of the responsibility of the central processing unit. This results in a faster, smoother user experience.

The software optimization may include, for example, at least one of quantization or network layer pruning. Quantization enforces the deep neural network model to be represented by lower-precision numbers, such as, for example, 16-bit, 8-bit, 4-bit, or the like, instead of a 32-bit full precision representation, which leads to a smaller memory footprint as well as lower computational cost. Quantization reduces memory footprint, computation cost, and power consumption of training and/or inference of the deep neural network model and, thus, facilitates deployment of the deep neural network model on resource-constrained hardware platforms, such as, for example, smart phones and the like, for a wide range of applications including computer vision, speech and audio recognition, natural language processing, recommender systems, and the like. Quantization aware training mimics the effects of quantization during training. The computations are carried-out in floating-point precision, but the subsequent quantization effect is taken into account. The weights and activations are quantized into lower precision only for inference when training is completed.

Network layer pruning removes unimportant neurons to reduce an over-parameterized deep neural network model. Pruning eliminates some of the deep neural network model's neurons to reduce size and decrease inference requirements of the deep neural network model. Pruning has been shown to achieve significant efficiency improvements, while minimizing a decrease in deep neural network model performance (inference/prediction quality). Deep neural network model layer pruning is recommended for environments that deploy deep neural network models on edge devices for mobile inference or the like. Further, for effective deployment, the energy saving capability of a deep neural network model can be energy-rated by illustrative embodiments to provide visibility for a centrally managed edge inference computing environment by, for example, an orchestrator, to effectively manage the edge inference computing environment.

Another issue with current solutions is that edge devices are not allowed to pull (e.g., determine) workload based on energy needs of a particular edge device. Workloads are mostly pushed to or pull by an edge device based on parameters, such as, for example, device architecture, memory, and the like, but not based on energy efficiency. Each edge device has its own energy characteristics, which include static energy characteristics, such as defined energy consumption specifications, and dynamic energy characteristics, such as real time energy consumption profiling or measurements. Illustrative embodiments perform energy scoring of edge devices based on these static and dynamic energy characteristics. As a result, illustrative embodiments can determine what kind of inference computing workload an edge device can run based on the edge device's corresponding energy score and deep neural network model.

A further issue is that current orchestrators for edge inference computing environments are not energy sensitive. For example, current orchestrators often handle vast numbers of edge devices having different configurations, energy consumption specifications, and computing capabilities. Also, current orchestrators have repositories of various deep neural network models having varied sizes, performance levels, accuracy levels, and energy requirements. Current orchestrators deploy a particular deep neural network model on a specific edge device based on static parameters, such as, device architecture and computing capability. However, current orchestrators do not take into account energy saving options corresponding to deployment and inferencing of the deep neural network model.

Illustrative embodiments resolve these issues by energy rating deep neural network models and energy scoring edge devices so that an edge inference computing environment orchestrator can now effectively manage the edge inference computing environment based on mapping an appropriate energy-rated deep neural network model to an energy-scored edge device using an energy-aware deployment policy generated by illustrative embodiments.

Illustrative embodiments perform the energy rating of deep neural network models based on energy efficient training via software optimization and hardware accelerators. Illustrative embodiments also utilize post training software optimization. During deep neural network model training, illustrative embodiments take into account model optimization, such as, for example, quantization aware training, network layer pruning, and architecture type of each respective deep neural network model. Further, illustrative embodiments determine an energy consumption profile of various hardware components, such as, for example, central processing unit, graphics processing unit, storage, memory, hardware accelerators, power supply unit, and the like, of respective edge devices. Illustrative embodiments determine an energy rating for a particular deep neural network model based on, for example, floating-point operations per second (FLOPS)/Watt consumed, power drawn from a power supply unit, increased energy rating of the deep neural network model based on software optimization of the deep neural network model, and the like. In computing, FLOPS/Watt is a measure of the energy efficiency of a particular computer architecture or computer hardware component. In other words, FLOPS/Watt measures the rate of computation that can be delivered by a computer or computer hardware component for every Watt of power consumed.

Illustrative embodiments perform energy scoring of hardware components of a particular edge device based on, for example, energy properties of the edge device, such as energy performance of the edge device, assigned component energy weights, and the like. Illustrative embodiments take into account static energy properties, such as, for example, architecture, speed, memory, computing capability, and the like, of the edge device. Illustrative embodiments also take into account dynamic energy properties, such as utilization (e.g., idleness or percentage of free time) of the edge device. Based on these energy properties, illustrative embodiments dynamically generate an energy score for each respective edge device as part of an edge device policy.

Illustrative embodiments generate an energy-aware deployment policy for automatic deployment of deep neural network models on edge inference computing devices based on architecture, computing capability, and the like. Illustrative embodiments utilize the energy-aware deployment policy to map an appropriate energy-rated deep neural network model to a particular energy-scored edge device.

Thus, illustrative embodiments are capable of providing visibility of energy efficiency of deep neural network models using corresponding energy ratings. This energy rating of deep neural network models by illustrative embodiments enables users to evaluate and select an appropriate deep neural network model per requirements (e.g., business requirements) of a particular user. In addition, a multitude of heterogenous edge device energy and computing properties are complex and difficult for users to easily understand when trying to deploy a deep neural network model on an edge device, which illustrative embodiments simplify by energy scoring respective edge devices in the edge inference computing environment. Based on the above deep neural network model energy rating and edge device energy scoring by illustrative embodiments, deep neural network model to edge device mapping can be easily performed by users manually. Alternatively, illustrative embodiments can autonomously map and deploy a deep neural network model to an edge device and make the process configurable by users.

As a result, illustrative embodiments enable entities, such as, for example, enterprises, companies, businesses, organizations, institutions, agencies, and the like, to effectively train and deploy deep neural network models on edge inference computing devices. Illustrative embodiments also provide options to build quantized and pruned deep learning models. Further, illustrative embodiments provide effective edge device monitoring and management capabilities to deploy any container-based workloads and deep neural network models on edge inference computing devices.

Thus, illustrative embodiments provide one or more technical solutions that overcome a technical problem with selectively deploying an appropriate deep neural network model on a particular edge inference computing device. As a result, these one or more technical solutions provide a technical effect and practical application in the field of edge inference computing.

With reference now to FIG. 3, a diagram illustrating an example of a deep neural network model energy rating system is depicted in accordance with an illustrative embodiment. Deep neural network (DNN) model energy rating system 300 may be implemented in a network of data processing systems, such as network data processing system 100 in FIG. 1. DNN model energy rating system 300 is a system of hardware and software components for energy rating deep neural network models.

In this example, DNN model energy rating system 300 includes DNN model computing environment 302 and energy-rated DNN model repository 304. DNN model computing environment 302 is comprised of central processing unit (CPU) and graphics processing unit (GPU) cores 306, hardware (HW) accelerators 308, power supply unit 310, DNN model profile 312, and DNN model energy rater 314. It should be noted that DNN model profile 312 may represent a plurality of different DNN model profiles corresponding to a plurality of different deep neural network models. DNN model profile 312 contains information, such as, for example, architecture type, dataset, weights, network layers, and the like, corresponding to a particular deep neural network model, such as DNN model 316. DNN model energy rater 314 may be a component of an orchestrator, such as, for example, edge inference computing environment orchestrator 218 in FIG. 2.

DNN model energy rater 314 computes FLOPS/Watt based on energy consumption of CPU and GPU cores 306, HW accelerators 308, and power supply unit 310. DNN model energy rater 314 converts the FLOPS/Watt to energy rating 318 for DNN model 316 based on existing benchmark values of existing energy efficient deep neural network models. Please see the example of FLOPS/Watt benchmarking table 400 in FIG. 4. DNN model energy rater 314 updates DNN model profile 312 corresponding to DNN model 316 to include energy rating 318.

At 320, DNN model energy rater 314 determines whether DNN model 316 is quantized (e.g., software optimized) after training. If DNN model energy rater 314 determines that DNN model 316 is not quantized post training, then DNN model energy rater 314 stores DNN model profile 312 corresponding to DNN model 316, which includes energy rating 318, in energy-rated DNN model repository 304. If DNN model energy rater 314 determines that DNN model 316 is quantized post training, then, at 322, DNN model energy rater 314 increases energy rating 318 of DNN model 316 to an overall energy efficiency rating (OEER) based on the quantization. At 324, DNN model energy rater 314 updates DNN model profile 312 corresponding to DNN model 316 to include OEER 326 and stores DNN model profile 312, which includes OEER 326, in energy-rated DNN model repository 304.

With reference now to FIG. 4, a diagram illustrating an example of an energy rating and overall energy efficiency rating for FLOPS/Watt benchmarking table is depicted in accordance with an illustrative embodiment. Energy rating and overall energy efficiency rating for FLOPS/Watt benchmarking table 400 may be implemented in an orchestrator, such as, for example, edge inference computing environment orchestrator 218 in FIG. 2.

In this example, energy rating and overall energy efficiency rating for FLOPS/Watt benchmarking table 400 includes FLOPS/Watt 402, energy rating 404, and overall energy efficiency rating 406. Energy rating and overall energy efficiency rating for FLOPS/Watt benchmarking table 400 provides a standard or scale for the orchestrator to match a given FLOPS/Watt measurement to a particular energy rating or overall energy efficiency rating corresponding to a deep neural network model.

With reference now to FIG. 5, a diagram illustrating an example of an energy-rated deep neural network model profile is depicted in accordance with an illustrative embodiment. Energy-rated deep neural network model profile 500 may be implemented in an orchestrator, such as, for example, edge inference computing environment orchestrator 218 in FIG. 2. Energy-rated deep neural network model profile 500 represents a profile, summary, or synopsis that corresponds to a particular deep neural network model, such as, for example, DNN model 316 in FIG. 3.

In this example, energy-rated deep neural network model profile 500 includes deep neural network (DNN) model architecture 502, energy rating 504, post model training quantization 506, and overall energy efficiency rating 508. DNN model architecture 502 identifies an architecture type of the DNN model (e.g., Mobilenet), whether quantization has been performed on the DNN model, whether hardware accelerators have been used with the DNN model, a FLOPS measurement, and a Watts measurement. Energy rating 504 identifies a final current energy rating for the DNN model based on hardware and software energy ratings. Post model training quantization 506 identifies whether quantization was performed on the DNN model after training and the level of precision of the DNN model after the post training quantization. Overall energy efficiency rating 508 identifies a final overall energy efficiency rating of the DNN model based on the information in post model training quantization 506.

Figure 6:
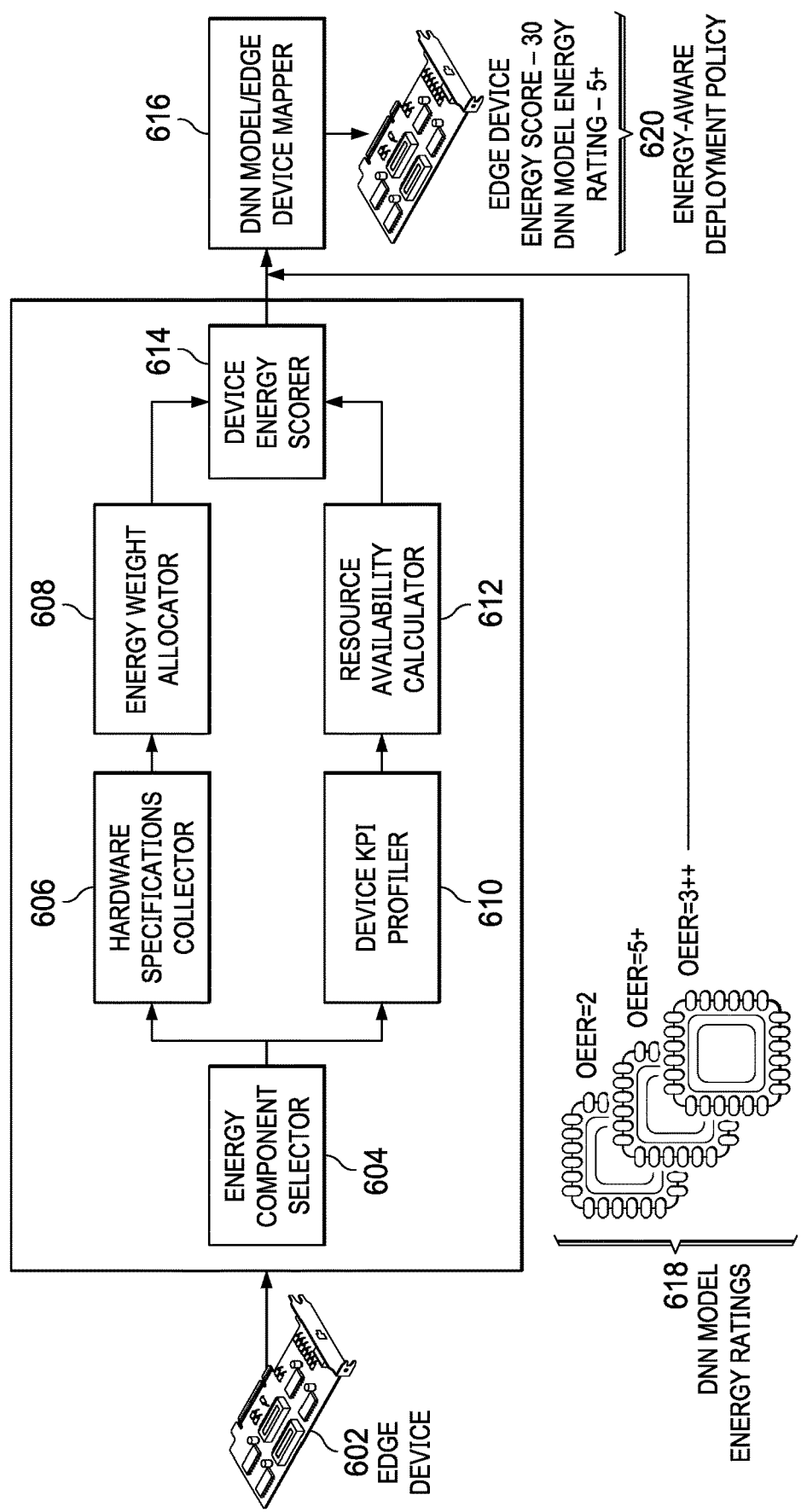
FIG. 6 is a diagram illustrating an example of an edge device energy scoring process in accordance with an illustrative embodiment.

With reference now to FIG. 6, a diagram illustrating an example of an edge device energy scoring process is depicted in accordance with an illustrative embodiment. Edge device energy scoring process 600 may be implemented in an orchestrator, such as, for example, edge inference computing environment orchestrator 218 in FIG. 2.

In this example, edge device energy scoring process 600 corresponds to edge device 602. Edge device 602 may be, for example, edge device 110 in FIG. 1. Edge device energy scoring process 600 utilizes energy component selector 604, hardware specification collector 606, energy weight allocator 608, device key performance indicator (KPI) profiler 610, resource availability calculator 612, device energy scorer 614, and deep neural network (DNN) model/edge device mapper 616. It should be noted that energy component selector 604, hardware specification collector 606, energy weight allocator 608, device KPI profiler 610, resource availability calculator 612, device energy scorer 614, and DNN model/edge device mapper 616 may be, for example, components of the orchestrator to enable artificial intelligence.

Edge device 602 is comprised of a plurality of different hardware components, such as, for example, a central processing unit, graphics processing unit, system on chip, memory, disk, input/output ports, universal serial bus, light emitting diodes, camera, microphone, and the like. Each of these hardware components has a different power requirement. Energy component selector 604 is responsible for selecting which hardware components in edge device 602 contribute most to energy consumption within edge device 602. Energy component selector 604 selects, for example, the top predetermined number (e.g., 4) of hardware components that contribute most to energy consumption in edge device 602 based on each respective hardware component's power requirement. Please see the example of top energy consuming components 706 in FIG. 7.

After energy component selector 604 selects the top predetermined number of energy consuming components in edge device 602, hardware specification collector 606 retrieves specification data for each of the top predetermined number of energy consuming components, such as, for example, number and speed for central processing unit and graphics processing unit, size and type for memory and storage, and the like. Please see the example of component specifications 708 in FIG. 7. These component specifications assist energy weight allocator 608 in assigning an energy weight for each of the top predetermined number of energy consuming components.

After hardware specification collector 606 gathers all specification data of the top predetermined number of energy consuming components in edge device 602, energy weight allocator 608 is responsible to allocate an energy weight to each of these components based on its power requirement and specification data. Allocation of energy weights to all top energy consuming components within edge device 602 can be done based on at least one of the manufacturer's operation manual for edge device 602 or performing basic load testing on edge device 602. Output of energy weight allocator 608 is allocation of an energy weight to the top predetermined number of energy consuming components within edge device 602. It should be noted that the sum of the energy weights for the top predetermined number of energy consuming components should equal "1" for edge device 602. Please see the example of energy weight 710 and total energy weight 712 in FIG. 7.

In addition, after energy component selector 604 selects the top predetermined number of energy consuming components in edge device 602, device KPI profiler 610 is responsible to collect current performance metrics, such as, for example, utilization of central processing unit, graphics processing unit, memory, disk, and the like, of the selected top predetermined number of energy consuming components in real time from, for example, an information technology operations (ITOps) system. After device KPI profiler 610 collects real time key performance indicators of the selected top predetermined number of energy consuming components, resource availability calculator 612 is responsible to calculate current resource availability in terms "Free % (F)" for each of the selected top predetermined number of energy consuming components by subtracting a component utilized value from a component total availability value and normalizing the difference to a percentage. Please see the example of free percentage 810 in FIG. 8.

Device energy scorer 614 is responsible to calculate a current energy score for edge device 602 based on multiplying the current energy weight (W) calculated by energy weight allocator 608 by the current availability (F) calculated by resource availability calculator 612 to produce an energy score for each of the selected top predetermined number of energy consuming components. Device energy scorer 614 then adds the energy scores of all the top energy consuming components together to generate a total current energy score for edge device 602. Please see the example of total current energy score 814 based on adding energy scores 812 in FIG. 8. It should be noted that device energy scorer 614 recalculates energy scores for each respective edge device in the edge inference computing environment on a predefined time interval basis.

Inputs to DNN model/edge device mapper 616 are DNN model energy ratings 618 retrieved from a repository, such as, for example, energy-rated DNN model repository 304 in FIG. 3, for a set of deep neural network models and the total current energy score for edge device 602 generated by device energy scorer 614. DNN model/edge device mapper 616 is responsible to map an appropriate energy-rated deep neural network model to edge device 602. DNN model/edge device mapper 616 ensures that energy efficiency is maintained while selecting the correct deep neural network model for an edge device for inference computing.

Energy-aware deployment policy 620 is flexible and can be customized according to overall energy efficiency ratings of trained deep neural network models and available current energy scores for respective edge devices in the edge inference computing environment. In this example, DNN model/edge device mapper 616 maps a DNN model's overall energy efficiency rating (OEER) of "5+" to the total current energy score of "30" for edge device 602 based on energy-aware deployment policy 620. Please see the example of DNN model to edge device deployment policy 900 in FIG. 9.

With reference now to FIG. 7, a diagram illustrating an example of an energy weight allocation to energy consuming components of edge devices table is depicted in accordance with an illustrative embodiment. Energy weight allocation to energy consuming components of edge devices table 700 may be implemented in an orchestrator, such as, for example, edge inference computing environment orchestrator 218 in FIG. 2.

In this example, energy weight allocation to energy consuming components of edge devices table 700 includes component energy weights for edge device A 702 and edge device B 704. However, it should be noted that energy weight allocation to energy consuming components of edge devices table 700 may include component energy weights for any number of edge devices. Energy weight allocation to energy consuming components of edge devices table 700 identifies top energy consuming components 706, which are selected by an energy component selector, such as, for example, energy component selector 604 in FIG. 6. Top energy consuming components 706 are a predefined number of top consuming energy components (e.g., 4) of an edge device. In this example, top energy consuming components 706 of edge device A 702 and edge device B 704 include a central processing unit, graphics processing unit, memory (e.g., RAM), and disk. However, it should be noted that top energy consuming components 706 may include any type of hardware component comprising an edge device. In addition, it should be noted that top energy consuming components 706 may include a different set of components for different edge devices.

Energy weight allocation to energy consuming components of edge devices table 700 also identifies component specifications 708, which are collected by a hardware specification collector, such as, for example, hardware specification collector 606 in FIG. 6, for each selected top energy consuming component of an edge device. The hardware specification collector collects the component specifications from the original equipment manufacturer of an edge device. In addition, energy weight allocation to energy consuming components of edge devices table 700 identifies energy weight 710, which is allocated by an energy weight allocator, such as, for example, energy weight allocator 608 in FIG. 6, for each selected top energy consuming component of the edge device. Further, energy weight allocation to energy consuming components of edge devices table 700 identifies total energy weight 712, which is also calculated by the energy weight calculator, for the edge device. It should be noted that total energy weight 712 for each respective edge device should equal 1.

With reference now to FIG. 8, a diagram illustrating an example of an edge device energy score calculation table is depicted in accordance with an illustrative embodiment. Edge device energy score calculation table 800 may be implemented in an orchestrator, such as, for example, edge inference computing environment orchestrator 218 in FIG. 2.

In this example, edge device energy score calculation table 800 includes edge device energy scores for edge device A 802 and edge device B 804. However, it should be noted that edge device energy score calculation table 800 may include edge device energy scores for any number of edge devices. Edge device energy score calculation table 800 identifies top energy consuming components 806, which are selected by an energy component selector, such as, for example, energy component selector 604 in FIG. 6. Top energy consuming components 806 are a predefined number of top consuming energy components (e.g., 4) of the edge device. In this example, top energy consuming components 806 of edge device A 802 and edge device B 804 include a central processing unit, graphics processing unit, memory, and disk. However, it should be noted that top energy consuming components 806 may include any type of hardware component comprising an edge device. In addition, it should be noted that top energy consuming components 806 may include a different set of components for different edge devices.

Edge device energy score calculation table 800 also identifies energy weight 808, which is allocated by an energy weight allocator, such as, for example, energy weight allocator 608 in FIG. 6, for each selected top energy consuming component of the edge device. In addition, edge device energy score calculation table 800 identifies free percentage 810, which is calculated by a resource availability calculator, such as, for example, resource availability calculator 612 in FIG. 6, for each selected top energy consuming component of the edge device. Further, edge device energy score calculation table 800 identifies energy score 812, which is calculated by a device energy scorer, such as, for example, device energy scorer 614 in FIG. 6, for each selected top energy consuming component of the edge device. The device energy scorer calculates energy score 812 for each selected top energy consuming component of the edge device by multiplying energy weight 808 by free percentage 810 for each selected top energy consuming component. Furthermore, edge device energy score calculation table 800 identifies total current energy score 814, which is also calculated by the device energy scorer, for the edge device. The device energy scorer calculates total current energy score 814 for an edge device by adding together all energy scores 812 of top energy consuming components 806.

With reference now to FIG. 9, a diagram illustrating an example of a deep neural network model to edge device deployment policy is depicted in accordance with an illustrative embodiment. Deep neural network model to edge device deployment policy 900 may be implemented in an orchestrator, such as, for example, edge inference computing environment orchestrator 218 in FIG. 2.

Deep neural network model to edge device deployment policy 900 includes deep neural network model's overall energy efficiency rating 902 and range of edge device energy scores 904. Deep neural network model's overall energy efficiency rating 902 identifies different overall energy efficiency rating levels for deep neural network models. Range of edge device energy scores 904 identify a defined range of energy scores for each respective level of overall energy efficiency ratings for deep neural network models.

In this example, a deep neural network model having an overall energy efficiency rating of 5, 5+, 5++, or 4++ is mapped to edge devices having an energy score less than or equal to 30. A deep neural network model having an overall energy efficiency rating of 4++, 4+, or 3++ is mapped to edge devices having an energy score greater than 30, but less than or equal to 50. A deep neural network model having an overall energy efficiency rating of 3, 3+, 2++, or 2+ is mapped to edge devices having an energy score greater than 50, but less than or equal to 70. A deep neural network model having an overall energy efficiency rating of 2, 1, 1+, or 1++ is mapped to edge devices having an energy score greater than 70, but less than or equal to 90.

Figure 10:
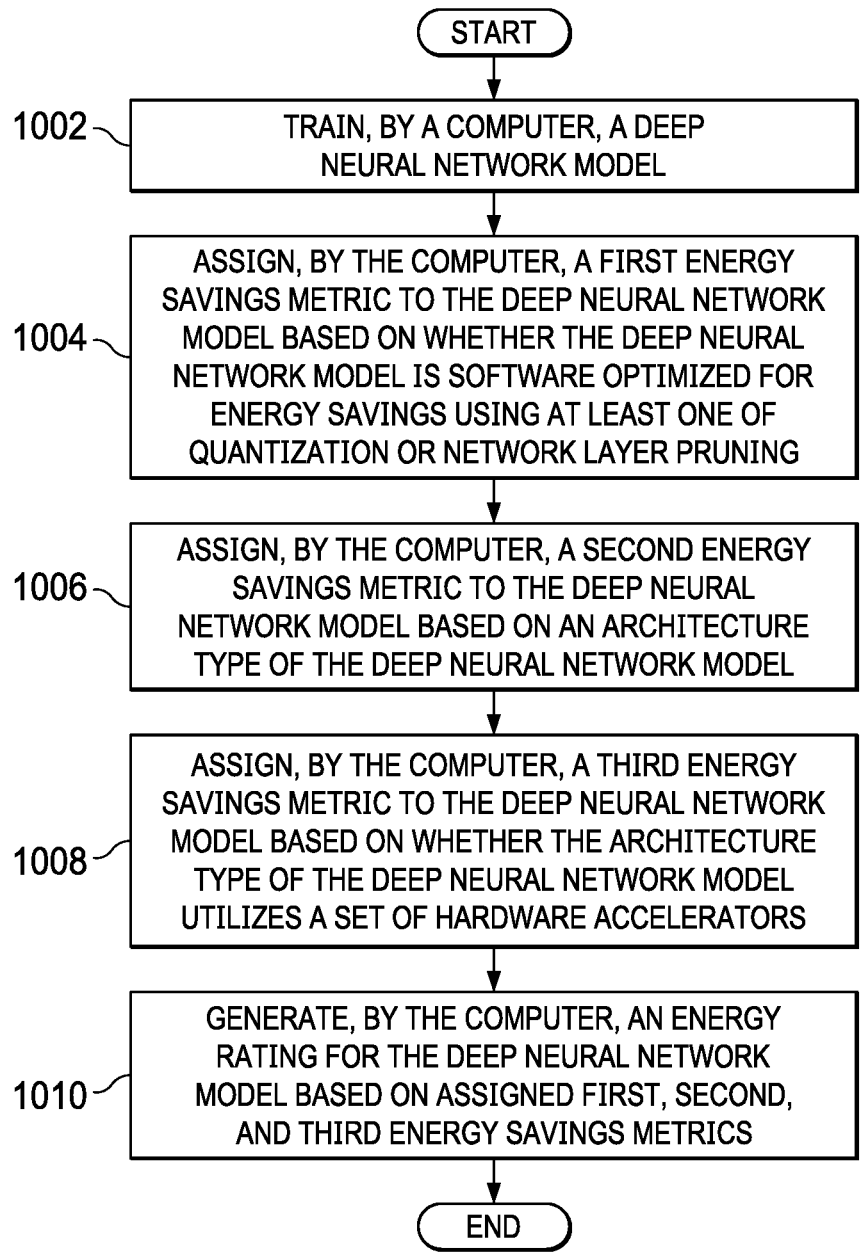
FIG. 10 is a flowchart illustrating a process for energy rating deep neural network models in accordance with an illustrative embodiment.

With reference now to FIG. 10, a flowchart illustrating a process for energy rating deep neural network models is shown in accordance with an illustrative embodiment. The process shown in FIG. 10 may be implemented in a computer, such as, for example, server 104 in FIG. 1 or data processing system 200 in FIG. 2. For example, the process shown in FIG. 10 may be implemented in edge inference computing environment orchestrator 218 in FIG. 2.

The process begins when the computer trains a deep neural network model (step 1002). In response to training the deep neural network model, the computer assigns a first energy savings metric to the deep neural network model based on whether the deep neural network model is software optimized for energy savings using at least one of quantization or network layer pruning (step 1004). The computer also assigns a second energy savings metric to the deep neural network model based on an architecture type of the deep neural network model (step 1006). In addition, the computer assigns a third energy savings metric to the deep neural network model based on whether the architecture type of the deep neural network model utilizes a set of hardware accelerators (step 1008). Then, the computer generates an energy rating for the deep neural network model based on assigned first, second, and third energy savings metrics (step 1010). Thereafter, the process terminates.

Figure 11:
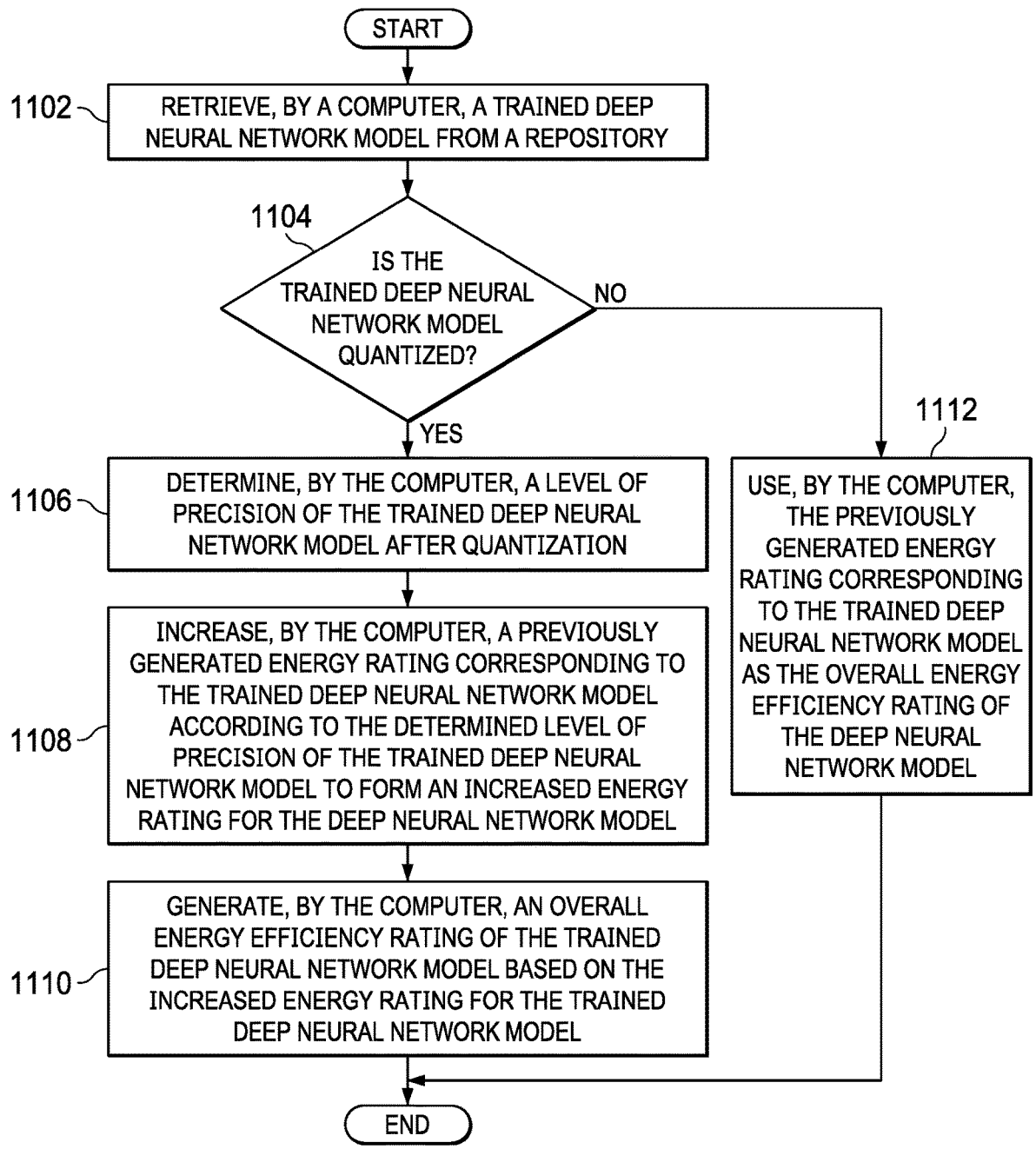
FIG. 11 is a flowchart illustrating a process for generating an overall energy efficiency rating for trained deep neural network models in accordance with an illustrative embodiment.

With reference now to FIG. 11, a flowchart illustrating a process for generating an overall energy efficiency rating for trained deep neural network models is shown in accordance with an illustrative embodiment. The process shown in FIG. 11 may be implemented in a computer, such as, for example, server 104 in FIG. 1 or data processing system 200 in FIG. 2. For example, the process shown in FIG. 11 may be implemented in edge inference computing environment orchestrator 218 in FIG. 2.

The process begins when the computer retrieves a trained deep neural network model from a repository (step 1102). In response to retrieving the trained deep neural network model, the computer makes a determination as to whether the trained deep neural network model is quantized (step 1104). If the computer determines that the trained deep neural network model is quantized, yes output of step 1104, then the computer determines a level of precision of the trained deep neural network model after quantization (step 1106).

Further, the computer increases a previously generated energy rating corresponding to the trained deep neural network model according to the determined level of precision of the trained deep neural network model to form an increased energy rating for the deep neural network model (step 1108). Furthermore, the computer generates an overall energy efficiency rating of the trained deep neural network model based on the increased energy rating for the trained deep neural network model (step 1110). Thereafter, the process terminates.

Returning again to step 1104, if the computer determines that the trained deep neural network model is not quantized, no output of step 1104, then the computer uses the previously generated energy rating corresponding to the trained deep neural network model as the overall energy efficiency rating of the deep neural network model (step 1112). Thereafter, the process terminates.

Figure 12A:
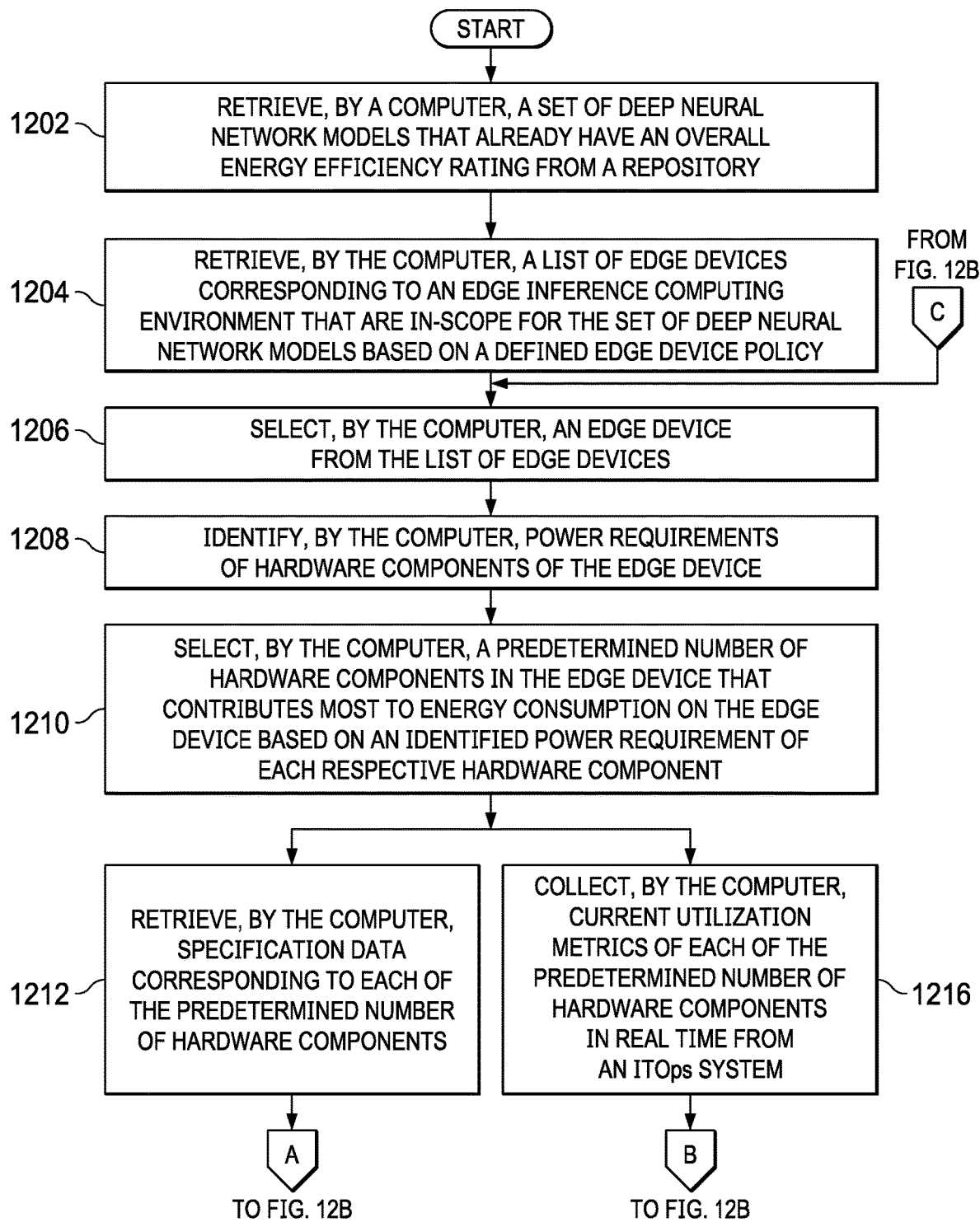

With reference now to FIGS. 12A-12B, a flowchart illustrating a process for energy scoring edge devices is shown in accordance with an illustrative embodiment. The process shown in FIGS. 12A-12B may be implemented in a computer, such as, for example, server 104 in FIG. 1 or data processing system 200 in FIG. 2. For example, the process shown in FIGS. 12A-12B may be implemented in edge inference computing environment orchestrator 218 in FIG. 2.

The process begins when the computer retrieves a set of deep neural network models that already have an overall energy efficiency rating from a repository (step 1202). In response to retrieving the set of deep neural network models, the computer retrieves a list of edge devices corresponding to an edge inference computing environment that are in-scope for the set of deep neural network models based on a defined edge device policy (step 1204). In addition, the computer selects an edge device from the list of edge devices (step 1206).

The computer identifies power requirements of hardware components of the selected edge device (step 1208). Further, the computer selects a predetermined number of hardware components in the edge device that contributes most to energy consumption on the edge device based on an identified power requirement of each respective hardware component (step 1210). Furthermore, the computer retrieves specification data corresponding to each of the predetermined number of hardware components (step 1212). Moreover, the computer assigns an energy weight to each of the predetermined number of hardware components based on the identified power requirement and the specification data corresponding to each of the predetermined number of hardware components (step 1214).

The computer also collects current utilization metrics of each of the predetermined number of hardware components in real time from an Information Technology Operations (ITOps) system (step 1216). The computer calculates current availability of each of the predetermined number of hardware components based on collected current utilization metrics of each of the predetermined number of hardware components (step 1218). It should be noted that the computer can perform steps 1216 and 1218 concurrently or in parallel with steps 1212 and 1214. Alternatively, the computer can perform steps 1212-1218 sequentially.

The computer generates a current energy score for the selected edge device based on assigned energy weight and calculated current availability of each of the predetermined number of hardware components (step 1220). In addition, the computer makes a determination as to whether a current energy score has been generated for each respective edge device in the list of edge devices (step 1222).

If the computer determines that a current energy score has not been generated for each respective edge device in the list of edge devices, no output of step 1222, then the process returns to step 1206 where the computer selects another edge device in the list of edge devices. If the computer determines that a current energy score has been generated for each respective edge device in the list of edge devices, yes output of step 1222, then the computer, using an energy-aware deployment policy, maps an appropriate deep neural network model in the set of deep neural network models to each respective edge device in the list of edge devices based on the overall energy efficiency rating of each respective deep neural network model and the current energy score of each respective edge device (step 1224). Thereafter, the process terminates.

Figure 13:
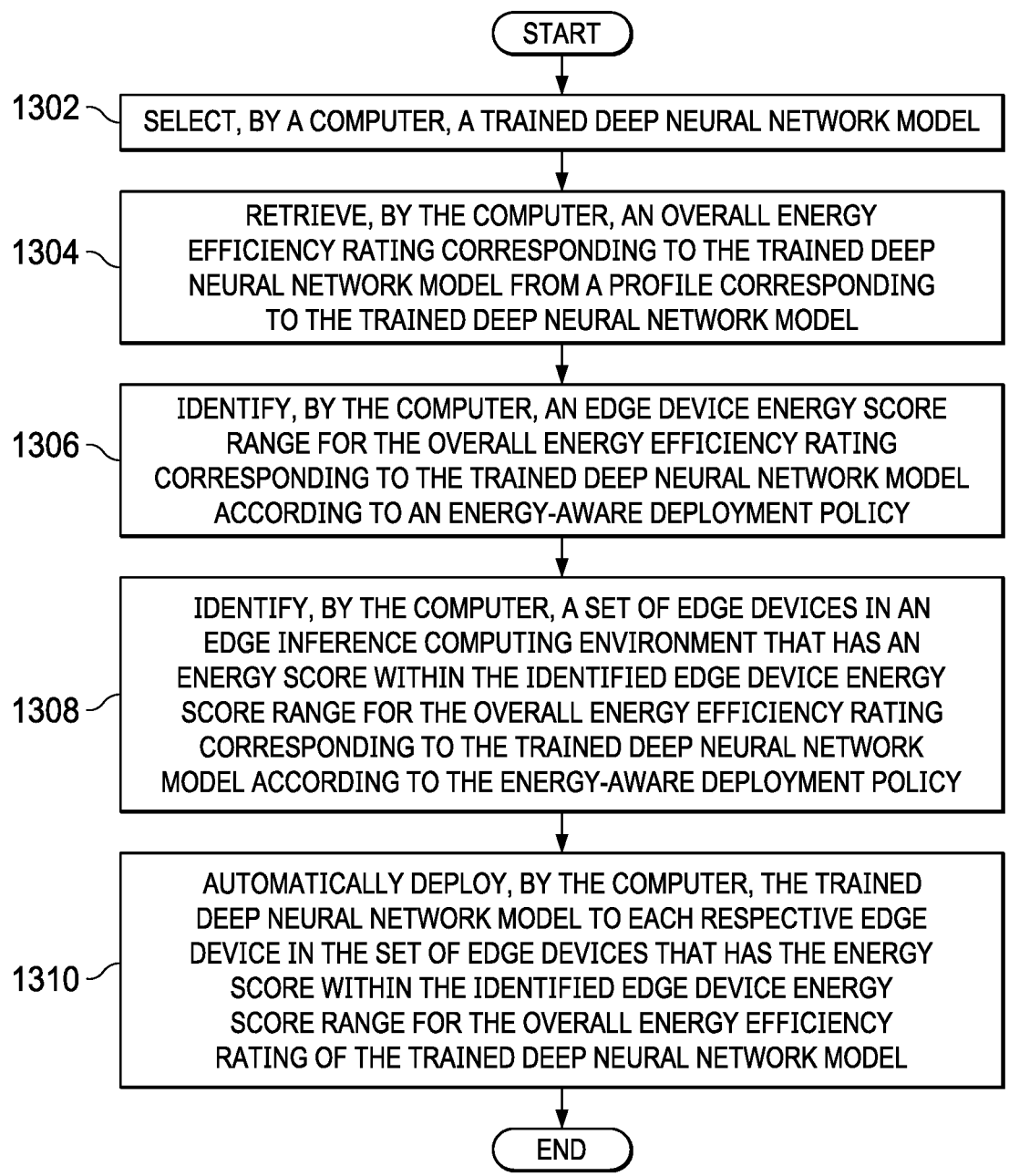
FIG. 13 is a flowchart illustrating a process for automatically deploying trained deep neural network models to edge devices in accordance with an illustrative embodiment.

With reference now to FIG. 13, a flowchart illustrating a process for automatically deploying trained deep neural network models to edge devices is shown in accordance with an illustrative embodiment. The process shown in FIG. 13 may be implemented in a computer, such as, for example, server 104 in FIG. 1 or data processing system 200 in FIG. 2. For example, the process shown in FIG. 13 may be implemented in edge inference computing environment orchestrator 218 in FIG. 2.

The process begins when the computer selects a trained deep neural network model (step 1302). In response to selecting the trained deep neural network model, the computer retrieves an overall energy efficiency rating corresponding to the trained deep neural network model from a profile corresponding to the trained deep neural network model (step 1304). Further, the computer identifies an edge device energy score range for the overall energy efficiency rating corresponding to the trained deep neural network model according to an energy-aware deployment policy (step 1306).

Furthermore, the computer identifies a set of edge devices in an edge inference computing environment that has an energy score within the identified edge device energy score range for the overall energy efficiency rating corresponding to the trained deep neural network model according to the energy-aware deployment policy (step 1308). The computer automatically deploys the trained deep neural network model to each respective edge device in the set of edge devices that has the energy score within the identified edge device energy score range for the overall energy efficiency rating of the trained deep neural network model (step 1310). Thereafter, the process terminates.

Figure 14:
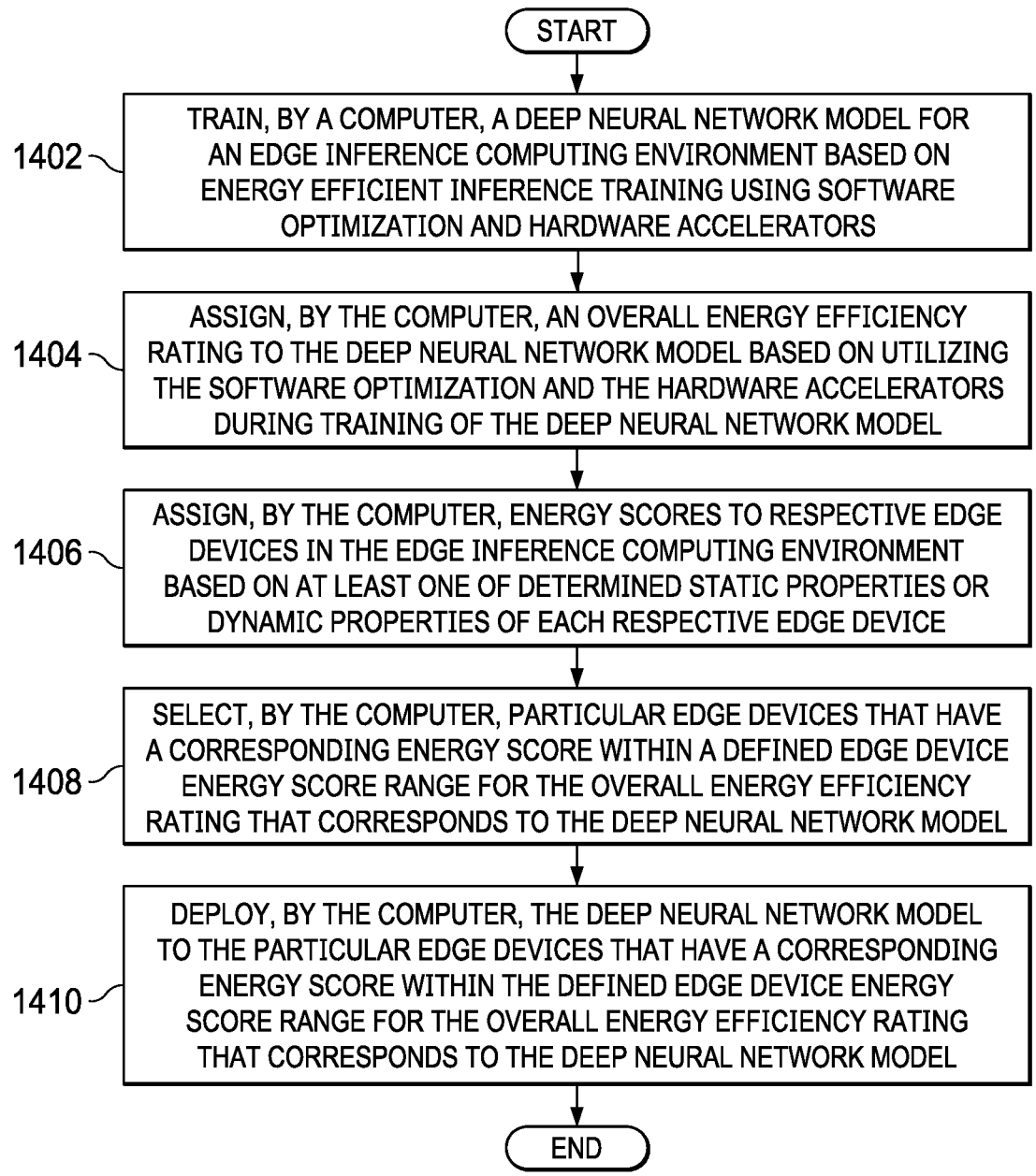
FIG. 14 is a flowchart illustrating a process for selectively deploying a deep neural network model to a particular set of edge devices in accordance with an illustrative embodiment.

With reference now to FIG. 14, a flowchart illustrating a process for selectively deploying a deep neural network model to a particular set of edge devices is shown in accordance with an illustrative embodiment. The process shown in FIG. 14 may be implemented in a computer, such as, for example, server 104 in FIG. 1 or data processing system 200 in FIG. 2. For example, the process shown in FIG. 14 may be implemented in edge inference computing environment orchestrator 218 in FIG. 2.

The process begins when the computer trains a deep neural network model for an edge inference computing environment based on energy efficient inference training using software optimization and hardware accelerators (step 1402). The computer assigns an overall energy efficiency rating to the deep neural network model based on utilizing the software optimization and the hardware accelerators during training of the deep neural network model (step 1404). The computer also assigns energy scores to respective edge devices in the edge inference computing environment based on at least one of determined static properties or dynamic properties of each respective edge device (step 1406).

The computer selects particular edge devices that have a corresponding energy score within a defined edge device energy score range for the overall energy efficiency rating that corresponds to the deep neural network model (step 1408). The computer deploys the deep neural network model to the particular edge devices that have a corresponding energy score within the defined edge device energy score range for the overall energy efficiency rating that corresponds to the deep neural network model (step 1410). Thereafter, the process terminates.

Thus, illustrative embodiments of the present invention provide a computer-implemented method, computer system, and computer program product for deploying and managing energy efficient deep neural network models on edge inference computing devices. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for deploying energy-rated deep neural network models on energy-scored edge devices, the computer-implemented method comprising:

assigning, by a computer, an overall energy efficiency rating to a deep neural network model based on utilizing software optimization and hardware accelerators during training of the deep neural network model;

identifying, by the computer, power requirements of each of a plurality of hardware components in each edge device of a plurality of edge devices that comprise an edge inference computing environment;

selecting, by the computer, a predetermined number of hardware components of the plurality of hardware components in each edge device that contributes most to energy consumption on each edge device based on an identified power requirement of each respective hardware component of the plurality of hardware components in each edge device;

assigning, by the computer, an energy weight to each of the predetermined number of hardware components that contributes most to the energy consumption on each edge device based on the identified power requirement of each respective hardware component of the plurality of hardware components in each edge device;

generating, by the computer, an energy score for each edge device of the plurality of edge devices in the edge inference computing environment based on the energy weight assigned to each of the predetermined number of hardware components that contributes most to the energy consumption on each respective edge device;

selecting, by the computer, particular edge devices of the plurality of edge devices that have the energy score within a defined edge device energy score range for the overall energy efficiency rating that corresponds to the deep neural network model; and deploying, by the computer, the deep neural network model to the particular edge devices that have the energy score within the defined edge device energy score range for the overall energy efficiency rating that corresponds to the deep neural network model.

2. The computer-implemented method of claim 1 further comprising:
assigning, by the computer, a first energy savings metric to the deep neural network model based on the software optimization for energy savings using at least one of quantization or network layer pruning;
assigning, by the computer, a second energy savings metric to the deep neural network model based on an architecture type of the deep neural network model;
assigning, by the computer, a third energy savings metric to the deep neural network model based on the architecture type of the deep neural network model utilizing the hardware accelerators; and
generating, by the computer, an energy rating for the deep neural network model based on the first energy savings metric, the second energy savings metric, and the third energy savings metric assigned to the deep neural network model.

3. The computer-implemented method of claim 2 further comprising:
determining, by the computer, a level of precision of the deep neural network model after the software optimization;
increasing, by the computer, the energy rating for the deep neural network model according to the level of precision of the deep neural network model to form an increased energy rating for the deep neural network model; and
generating, by the computer, the overall energy efficiency rating of the deep neural network model based on the increased energy rating for the deep neural network model.

4. The computer-implemented method of claim 1 further comprising:
retrieving, by the computer, the overall energy efficiency rating corresponding to the deep neural network model from a profile corresponding to the deep neural network model;
identifying, by the computer, the defined edge device energy score range for the overall energy efficiency rating corresponding to the deep neural network model according to an energy-aware deployment policy;
identifying, by the computer, a set of edge devices in the edge inference computing environment that has the energy score within the defined edge device energy score range for the overall energy efficiency rating corresponding to the deep neural network model according to the energy-aware deployment policy; and
deploying, by the computer, the deep neural network model automatically to each respective edge device in the set of edge devices that has the energy score within the defined edge device energy score range for the overall energy efficiency rating of the deep neural network model.

5. The computer-implemented method of claim 1 further comprising:
retrieving, by the computer, a set of deep neural network models that already have an overall energy efficiency rating from a repository;
retrieving, by the computer, a list of edge devices corresponding to the edge inference computing environment that are in-scope for the set of deep neural network models based on a defined edge device policy;
identifying, by the computer, power requirements of hardware components of each edge device in the list of edge devices; and
selecting, by the computer, a predetermined number of hardware components in each edge device that contributes most to energy consumption on each edge device based on an identified power requirement of each respective hardware component.

6. The computer-implemented method of claim 5 further comprising:
retrieving, by the computer, specification data corresponding to each of the predetermined number of hardware components in each edge device that contributes most to energy consumption on each edge device; and
assigning, by the computer, an energy weight to each of the predetermined number of hardware components based on the identified power requirement of each respective hardware component and the specification data corresponding to each of the predetermined number of hardware components.

7. The computer-implemented method of claim 6 further comprising:
collecting, by the computer, current utilization metrics of each of the predetermined number of hardware components in real time from an Information Technology Operations system; and
calculating, by the computer, current availability of each of the predetermined number of hardware components based on collected current utilization metrics of each of the predetermined number of hardware components.

8. The computer-implemented method of claim 7 further comprising:
generating, by the computer, a current energy score for each edge device based on assigned energy weight and calculated current availability of each of the predetermined number of hardware components in each edge device that contributes most to energy consumption on each edge device; and
mapping, by the computer, using an energy-aware deployment policy, an appropriate deep neural network model in the set of deep neural network models to each respective edge device in the list of edge devices based on the overall energy efficiency rating of each respective deep neural network model and the current energy score of each respective edge device.

9. A computer system for deploying energy-rated deep neural network models on energy-scored edge devices, the computer system comprising:
a bus system;
a storage device connected to the bus system, wherein the storage device stores program instructions; and
a processor connected to the bus system, wherein the processor executes the program instructions to:
assign an overall energy efficiency rating to a deep neural network model based on utilizing software optimization and hardware accelerators during training of the deep neural network model;
identify power requirements of each of a plurality of hardware components in each edge device of a plurality of edge devices that comprise an edge inference computing environment;
select a predetermined number of hardware components of the plurality of hardware components in each edge device that contributes most to energy consumption on each edge device based on an identified power requirement of each respective hardware component of the plurality of hardware components in each edge device;

assign an energy weight to each of the predetermined number of hardware components that contributes most to the energy consumption on each edge device based on the identified power requirement of each respective hardware component of the plurality of hardware components in each edge device;

generate an energy score for each edge device of the plurality of edge devices in the edge inference computing environment based on the energy weight assigned to each of the predetermined number of hardware components that contributes most to the energy consumption on each respective edge device;

select particular edge devices of the plurality of edge devices that have the energy score within a defined edge device energy score range for the overall energy efficiency rating that corresponds to the deep neural network model; and deploy the deep neural network model to the particular edge devices that have the energy score within the defined edge device energy score range for the overall energy efficiency rating that corresponds to the deep neural network model.

10. The computer system of claim 9, wherein the processor further executes the program instructions to:

assign a first energy savings metric to the deep neural network model based on the software optimization for energy savings using at least one of quantization or network layer pruning;

assign a second energy savings metric to the deep neural network model based on an architecture type of the deep neural network model;

assign a third energy savings metric to the deep neural network model based on the architecture type of the deep neural network model utilizing the hardware accelerators; and generate an energy rating for the deep neural network model based on the first energy savings metric, the second energy savings metric, and the third energy savings metric assigned to the deep neural network model.

11. The computer system of claim 10, wherein the processor further executes the program instructions to:

determine a level of precision of the deep neural network model after the software optimization;

increase the energy rating for the deep neural network model according to the level of precision of the deep neural network model to form an increased energy rating for the deep neural network model; and generate the overall energy efficiency rating of the deep neural network model based on the increased energy rating for the deep neural network model.

12. The computer system of claim 9, wherein the processor further executes the program instructions to:

retrieve the overall energy efficiency rating corresponding to the deep neural network model from a profile corresponding to the deep neural network model;

identify the defined edge device energy score range for the overall energy efficiency rating corresponding to the deep neural network model according to an energy-aware deployment policy;

identify a set of edge devices in the edge inference computing environment that has the energy score within the defined edge device energy score range for the overall energy efficiency rating corresponding to the deep neural network model according to the energy-aware deployment policy; and deploy the deep neural network model automatically to each respective edge device in the set of edge devices that has the energy score within the defined edge device energy score range for the overall energy efficiency rating of the deep neural network model.

13. A computer program product for deploying energy-rated deep neural network models on energy-scored edge devices, the computer program product comprising a computer-readable storage medium having program instructions embodied therewith, the program instructions executable by a computer to cause the computer to perform a method of:

assigning, by the computer, an overall energy efficiency rating to a deep neural network model based on utilizing software optimization and hardware accelerators during training of the deep neural network model;

identifying, by the computer, power requirements of each of a plurality of hardware components in each edge device of a plurality of edge devices that comprise an edge inference computing environment;

selecting, by the computer, a predetermined number of hardware components of the plurality of hardware components in each edge device that contributes most to energy consumption on each edge device based on an identified power requirement of each respective hardware component of the plurality of hardware components in each edge device;

assigning, by the computer, an energy weight to each of the predetermined number of hardware components that contributes most to the energy consumption on each edge device based on the identified power requirement of each respective hardware component of the plurality of hardware components in each edge device;

generating, by the computer, an energy score for each edge device of the plurality of edge devices in the edge inference computing environment based on the energy weight assigned to each of the predetermined number of hardware components that contributes most to the energy consumption on each respective edge device;

selecting, by the computer, particular edge devices of the plurality of edge devices that have the energy score within a defined edge device energy score range for the overall energy efficiency rating that corresponds to the deep neural network model; and deploying, by the computer, the deep neural network model to the particular edge devices that have the energy score within the defined edge device energy score range for the overall energy efficiency rating that corresponds to the deep neural network model.

14. The computer program product of claim 13 further comprising:

assigning, by the computer, a first energy savings metric to the deep neural network model based on the software optimization for energy savings using at least one of quantization or network layer pruning;

assigning, by the computer, a second energy savings metric to the deep neural network model based on an architecture type of the deep neural network model;

assigning, by the computer, a third energy savings metric to the deep neural network model based on the architecture type of the deep neural network model utilizing the hardware accelerators; and generating, by the computer, an energy rating for the deep neural network model based on the first energy savings metric, the second energy savings metric, and the third energy savings metric assigned to the deep neural network model.

15. The computer program product of claim 14 further comprising:
   determining, by the computer, a level of precision of the deep neural network model after the software optimization;
   increasing, by the computer, the energy rating for the deep neural network model according to the level of precision of the deep neural network model to form an increased energy rating for the deep neural network model; and
   generating, by the computer, the overall energy efficiency rating of the deep neural network model based on the increased energy rating for the deep neural network model.

16. The computer program product of claim 13 further comprising:
   retrieving, by the computer, the overall energy efficiency rating corresponding to the deep neural network model from a profile corresponding to the deep neural network model;
   identifying, by the computer, the defined edge device energy score range for the overall energy efficiency rating corresponding to the deep neural network model according to an energy-aware deployment policy;
   identifying, by the computer, a set of edge devices in the edge inference computing environment that has the energy score within the defined edge device energy score range for the overall energy efficiency rating corresponding to the deep neural network model according to the energy-aware deployment policy; and
   deploying, by the computer, the deep neural network model automatically to each respective edge device in the set of edge devices that has the energy score within the defined edge device energy score range for the overall energy efficiency rating of the deep neural network model.

17. The computer program product of claim 13 further comprising:
   retrieving, by the computer, a set of deep neural network models that already have an overall energy efficiency rating from a repository;
   retrieving, by the computer, a list of edge devices corresponding to the edge inference computing environment that are in-scope for the set of deep neural network models based on a defined edge device policy;
   identifying, by the computer, power requirements of hardware components of each edge device in the list of edge devices; and
   selecting, by the computer, a predetermined number of hardware components in each edge device that contributes most to energy consumption on each edge device based on an identified power requirement of each respective hardware component.

18. The computer program product of claim 17 further comprising:
   retrieving, by the computer, specification data corresponding to each of the predetermined number of hardware components in each edge device that contributes most to energy consumption on each edge device; and
   assigning, by the computer, an energy weight to each of the predetermined number of hardware components based on the identified power requirement of each respective hardware component and the specification data corresponding to each of the predetermined number of hardware components.

19. The computer program product of claim 18 further comprising:
   collecting, by the computer, current utilization metrics of each of the predetermined number of hardware components in real time from an Information Technology Operations system; and
   calculating, by the computer, current availability of each of the predetermined number of hardware components based on collected current utilization metrics of each of the predetermined number of hardware components.

20. The computer program product of claim 19 further comprising:
   generating, by the computer, a current energy score for each edge device based on assigned energy weight and calculated current availability of each of the predetermined number of hardware components in each edge device that contributes most to energy consumption on each edge device; and
   mapping, by the computer, using an energy-aware deployment policy, an appropriate deep neural network model in the set of deep neural network models to each respective edge device in the list of edge devices based on the overall energy efficiency rating of each respective deep neural network model and the current energy score of each respective edge device.

* * * * *